(12) United States Patent
Munks

(10) Patent No.: US 6,587,214 B1
(45) Date of Patent: Jul. 1, 2003

(54) OPTICAL POWER AND WAVELENGTH MONITOR

(75) Inventor: Timothy C. Munks, North Granby, CT (US)

(73) Assignee: JDS Uniphase Corporation, Ottawa (CA)

(*) Notice: Subject to any disclaimer, the term of this patent is extended or adjusted under 35 U.S.C. 154(b) by 111 days.

(21) Appl. No.: 09/603,403

(22) Filed: Jun. 26, 2000

(51) Int. Cl.[7] .................................................. G01B 9/02
(52) U.S. Cl. ...................................................... 356/519
(58) Field of Search ................................ 356/454, 480, 356/519; 372/29.02, 29.021, 32

(56) References Cited

U.S. PATENT DOCUMENTS

| | | | |
|---|---|---|---|
| 4,815,081 A | 3/1989 | Mahlein et al. ................ 372/32 |
| 4,913,525 A | 4/1990 | Asakura et al. ......... 350/162.12 |
| 5,042,042 A | 8/1991 | Hori et al. |
| 5,068,864 A | 11/1991 | Javan ............................ 372/32 |
| 5,208,819 A | 5/1993 | Huber ........................... 372/32 |
| 5,299,212 A | 3/1994 | Koch et al. .................... 372/32 |
| 5,323,409 A | 6/1994 | Laskoskie et al. ............. 372/32 |
| 5,428,700 A | 6/1995 | Hall .............................. 372/32 |
| 5,544,183 A | 8/1996 | Takeda ......................... 372/38 |
| 5,691,989 A | 11/1997 | Rakuljic et al. ............... 372/20 |
| 5,706,301 A | 1/1998 | Lagerstrom ................... 372/32 |
| 5,780,843 A | 7/1998 | Cliche et al. ................ 250/226 |
| 5,798,859 A | 8/1998 | Colbourne et al. .......... 359/247 |
| 5,825,792 A | 10/1998 | Villeneuve et al. ............ 372/32 |
| 5,867,513 A | 2/1999 | Sato ............................. 372/32 |
| 6,243,403 B1 * | 6/2001 | Broutin et al. ................ 372/32 |

FOREIGN PATENT DOCUMENTS

| | | |
|---|---|---|
| JP | 04157780 | 5/1992 |
| WO | WO 97/05679 | 2/1997 |
| WO | WO 98/50988 | 11/1998 |
| WO | WO 99/04466 | 1/1999 |
| WO | WO 99/08349 | 2/1999 |
| WO | WO 99/43060 | 8/1999 |
| WO | WO 01/08277 A1 | 2/2001 |

* cited by examiner

Primary Examiner—Samuel A. Turner
(74) Attorney, Agent, or Firm—Kurt Rauschenbach; Rauschenbach Patent Law Group, LLC

(57) ABSTRACT

An optical power and wavelength monitor of an optical beam is described. The monitor includes a first detector positioned in the path of the optical beam that generates a first electrical signal that is proportional to an optical power of the optical beam. The monitor also includes an optical filter that is positioned in the path of the optical beam. The optical filter transmits a portion of the optical beam having a wavelength within a bandwidth of the optical filter. A second detector that is positioned in the path of the optical beam generates a second electrical signal that is proportional to an optical power of the filtered optical beam. A signal processor receives the first and second electrical signals and generates a signal that is proportional to the wavelength of the optical beam.

11 Claims, 10 Drawing Sheets

OPTICAL POWER AND WAVELENGTH MONITOR

FIELD OF THE INVENTION

The invention relates to optical signal monitoring, and more particularly to apparatus and methods for monitoring the wavelength and power of an optical communication signal.

BACKGROUND OF THE INVENTION

Modem optical fiber communication systems have high bandwidth and low transmission loss. The bandwidth of an optical fiber determines how much information can be transmitted without losing data due to degradation in the optical signal. Many modem optical fiber communication systems use Wavelength Division Multiplexing (WDM).

In WDM communication systems, separate signals having different carrier wavelengths are transmitted simultaneously through a single optical fiber. The number of wavelengths simultaneously propagating in a fiber is proportional to the bandwidth of the communication system. Each wavelength bandwidth occupies a certain channel spacing in the communication system. The more closely spaced the carrier wavelengths, the more channels that can be propagated simultaneously. However, as the spacing between the wavelengths becomes smaller, the probability of cross talk between channels increases. This cross talk is undesirable because data from one channel interferes with data from another channel, thereby causing erroneous data to be propagated in the communication system and ultimately corrupting the data at the receiver.

In order to maximize the number of available channels in a WDM communication system, each laser source must generate an optical beam having a relatively stable wavelength. The lasers used for WDM transmitters generally emit light at a stable wavelength and the wavelength can be precisely controlled. However, many laser sources experience wavelength drift over time caused by temperature, aging, and modal instability. Wavelength drift can cause cross talk and result in a loss of data in WDM communication systems and, therefore, must be monitored and compensated.

Numerous apparatus and methods have been used to monitor the wavelength of optical signals in WDM communication systems. Some of these apparatus and methods split an input signal into two signals and filter one signal with a low-pass filter and the other signal with a high-pass filter. The filtered signals are directed to two closely spaced detectors. The electrical signals generated by the two detectors are then compared. By selecting the characteristics of the filters correctly, the wavelength of the optical signals can be precisely determined and monitored.

Other apparatus and methods used to monitor the wavelength of optical signals in WDM communication systems use a channel selector, such as a crystal grating or diffraction grating, and a wavemeter to monitor the optical signals. For example, in one prior art apparatus, an optical signal is first separated into channels by a channel selector and then propagated to a wavemeter that monitors the wavelength of the optical signal in each channel.

These prior art wavelength monitors are generally impractical for modem high capacity optical communication systems because they are complex and occupy relatively large volumes. In addition, these prior art wavelength monitors use differential detection methods to measure the wavelength of the communication signal, which can result in erroneous measurements. These differential detection methods require at least two photodetectors that each sample different portions of the waveguide mode.

Measuring different portions of the waveguide mode can lead to uncertainty in the measured wavelength due to modal instability. These uncertainties can result in erroneous measurements, which can result in incorrect compensation. If the waveguide is a single mode optical fiber, the mode is typically very stable. However, if the waveguide is multimode, there are modal instabilities under some conditions. There are several factors, which cause modal stability in the propagation media. These factors include the level of injection current, the condition of the facet coating, the efficiency and the operating temperature.

SUMMARY OF THE INVENTION

The present invention relates to wavelength and power monitors, which do not experience the disadvantages of differential detection and other prior art methods of monitoring wavelength. A principle discovery of the present invention is that an optical wavelength and power monitor can be constructed to monitor one portion of the mode of a single optical beam and can substantially simultaneously determine the wavelength and the optical power of a single optical beam.

Accordingly, the present invention features an optical beam monitor that includes a first detector positioned in the path of an optical beam. In one embodiment, the first detector comprises a semitransparent photodiode that transmits a portion of the optical beam. The first detector may include an anti-reflection coating that prevents a portion of the optical beam from reflecting off of the first detector. The first detector generates an electrical signal that is proportional to the optical power of the incident optical beam.

An optical filter, such as a Fabry-Perot filter or a thin film filter, is positioned in the path of the optical beam and passes a portion of the optical beam corresponding to a wavelength within the bandwidth of the optical filter. In one embodiment, the optical filter comprises a narrow band-pass filter. A substrate may be disposed between the first detector and the optical filter. In one embodiment, the substrate is formed of glass. In one embodiment, the substrate includes an anti-reflection coating on at least one end of the substrate to prevent reflections. In another embodiment, a glass wedge is disposed between the first detector and the optical filter in order to deflect any reflected beams away from the first photodiode, thereby reducing the detection of erroneous signals. The glass wedge may include an anti-reflection coating to prevent reflections.

A second detector is positioned in the path of the optical beam. The second detector generates a second electrical signal that is proportional to the optical power of the filtered optical beam. A processor is electrically coupled to the first and second detector and is used to generate a signal that characterizes the wavelength and power of the optical beam. This signal can be used to control the wavelength and power of the optical source that generates the optical beam.

The present invention also features an apparatus for monitoring the optical power and the wavelength of optical signals in a wavelength division multiplexed communication system. The apparatus includes a multi-wavelength laser that generates an optical beam. A first detector is positioned in a path of the optical beam. The first detector generates a first electrical signal that is proportional to an optical power of the optical beam transmitting in the communication system. An optical filter is positioned in the path of the optical beam. The optical filter transmits a portion of the optical beam that corresponds to a channel of the communication system.

A second detector is positioned in the path of the optical beam. The second detector generates a second electrical signal that is proportional to an optical power of the filtered optical beam corresponding to the channel. A signal processor receives the first and second electrical signals. The signal processor generates at least one signal that corresponds to the wavelength and power of the optical beam transmitting in the communication system. This signal can be used to control the wavelength and power of the multi-wavelength laser.

The present invention also features a method for monitoring the wavelength and power of an optical beam. The method includes detecting an optical beam and generating a first electrical signal that corresponds to an optical power of the optical beam. A portion of the optical beam having a wavelength within a predetermined bandwidth is then detected. A second electrical signal is generated that corresponds to an optical power of the portion of the optical beam within the predetermined bandwidth. The first and second electrical signals are processed and a signal is generated that characterizes the optical beam. In one embodiment, the signal controls a source that generates the optical beam.

The above and other objects, features and advantages of the present invention and the manner of realizing them will become more apparent, and the invention itself will best be understood from a study of the following description and appended claims with reference to the attached drawings showing some of the numerous embodiments of the invention.

DETAILED DESCRIPTION

Figure 1:
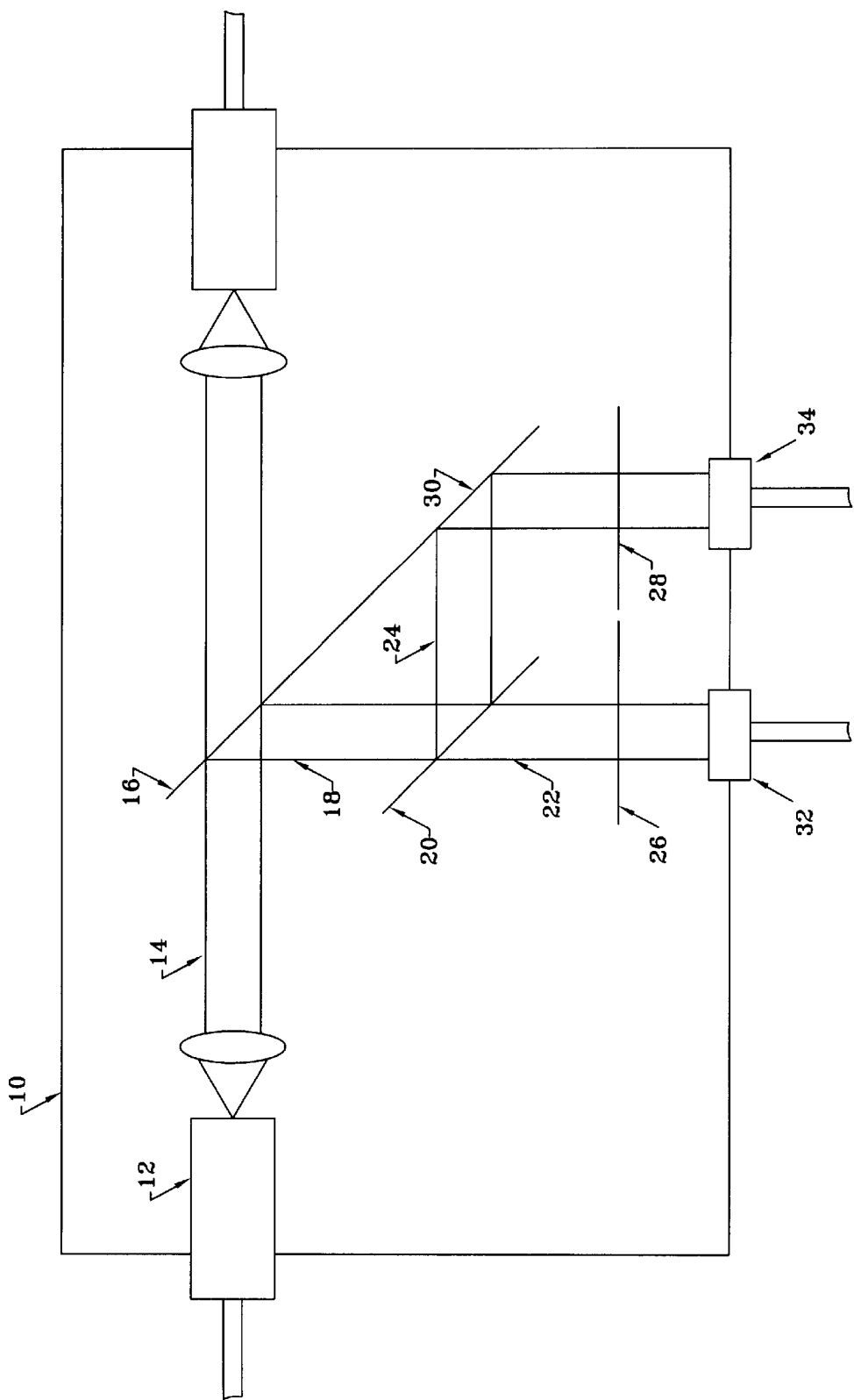
FIG. 1 is a schematic diagram of a prior art wavelength monitor that uses differential detection.

FIG. 1 is a schematic diagram of a prior art wavelength monitor 10 that uses differential detection. A source 12 generates an optical beam 14. A beam splitter 16 samples a portion of beam 14 and directs a sampled beam 18 to a second beam splitter 20. The second beam splitter 20 splits the sampled beam into a first 22 and second sampled beam 24. The second beam splitter 20 directs the first sampled beam 22 to a low pass filter 26 and the second sampled beam 24 to a high pass filter 28. The monitor 10 uses a mirror 30 to direct the second sampled beam 24 to the high pass filter 28. A first detector 32 measures the optical power of the beam transmitting though the low pass filter 26. A second detector 34 measures the optical power of the beam transmitting through the high pass filter 28.

Figure 2:
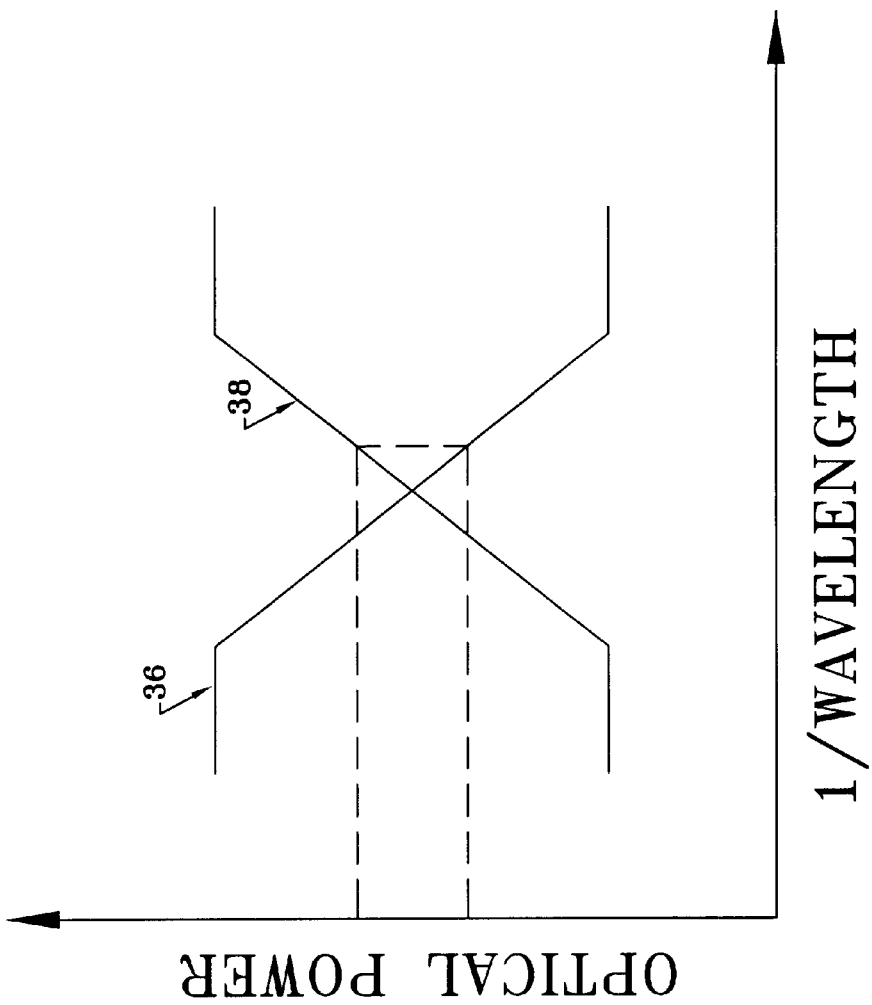
FIG. 2 is a graph that illustrates the output characteristics of the first and second detector of the prior art wavelength monitor of FIG. 1.

FIG. 2 is a graph that illustrates the output characteristics of the first 32 and second detector 34 of the prior art wavelength monitor of FIG. 1. The first detector 32 measures a low pass characteristic 36. The second detector 34 measures a high pass characteristic 38. The center frequency of both the low pass 32 and high pass filter 34 is generally chosen to approximate the wavelength of the optical beam 14 generated by source 12.

In operation, as the wavelength of the optical beam 14 changes, the optical power detected by the first 32 detector changes in a direction that is inversely proportional to the change in the optical power detected by the second detector 34. Therefore, the wavelength of the optical beam 14 can be monitored by measuring the ratio of optical power detected by the first 32 detector to the optical power detected by the second detector 34. This ratio is a sensitive measure of the change in the wavelength of the optical beam generated by source 12. This method, however, uses two photodetectors that measure different portions of the optical mode. Therefore, this method is subject to uncertainty in the measured wavelength due to modal instability as described above.

Figure 3:
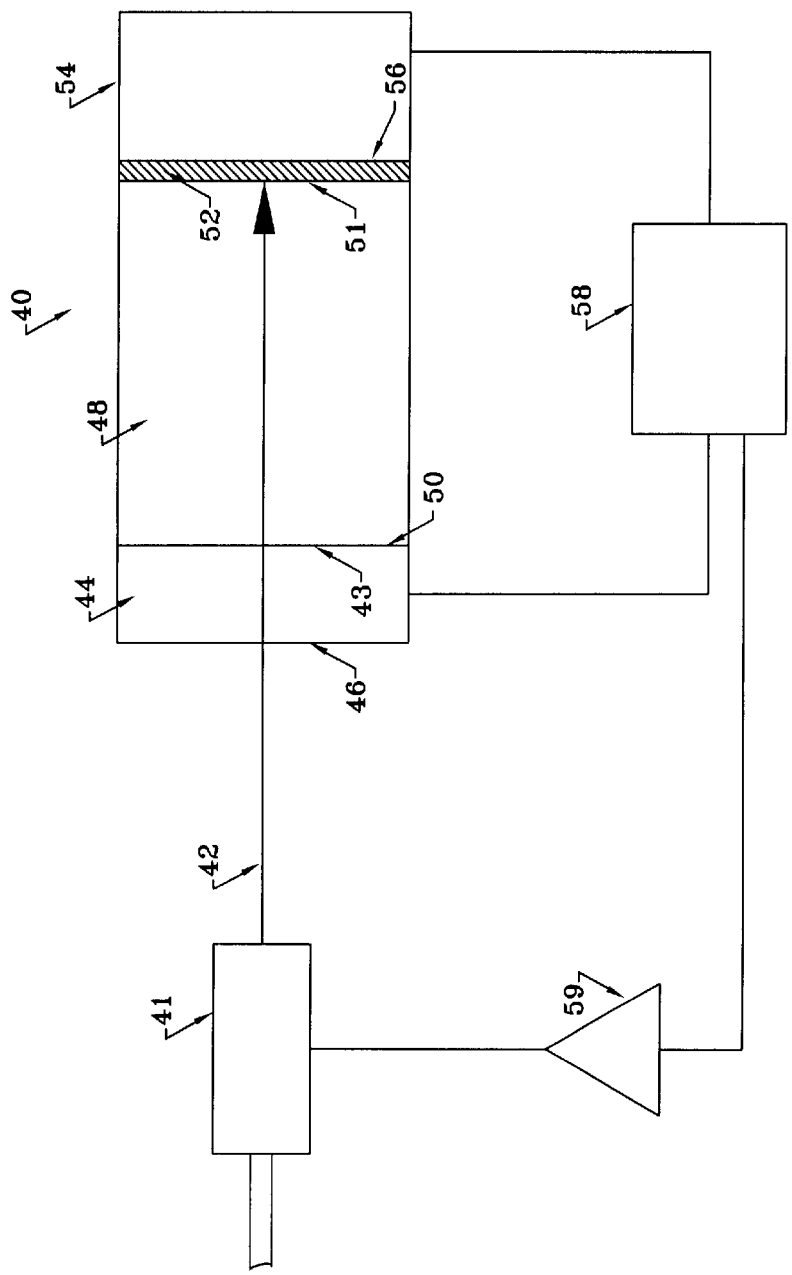
FIG. 3 is a schematic diagram of one embodiment of a wavelength and power monitor of the present invention.

FIG. 3 is a schematic diagram of one embodiment of a wavelength and power monitor 40 of the present invention. The monitor 40 includes an optical source 41 that generates an incident optical beam 42. A collimating lens (not shown) may be positioned in the path of the incident optical beam 42. In one embodiment, the optical source 41 is a tunable semiconductor laser that is suitable for use in a wavelength division multiplexed (WDM) communication system. For example, the optical source 41 may be a distributed feedback semiconductor laser., The monitor 40 also includes a first photodiode 44 that is partially transparent. The first photodiode 44 generates a first electrical signal that is proportional to the optical power of the incident optical beam 42. A portion of the optical beam 42 is transmitted through an exit surface 43 of the first photodiode 44. The first photodiode 44 may include an anti-reflection (AR) coating on an incident surface 46 to reduce reflections from the incident surface.

The first photodiode 44 is mounted to a substrate 48 that is at least partially transparent. The substrate 48 may comprise glass. The substrate 48 may.have an AR coating on an incident surface 50 to prevent reflected light from striking the first photodiode 44 and generating an erroneous signal. In another embodiment, the substrate 48 is wedge shaped in order to deflect any reflected beams away from the first photodiode 44, thereby preventing erroneous signals.

The monitor 40 also includes a thin film optical filter 52 that is positioned on an exit surface 51 of the substrate 48. In another embodiment, free space separates the first photodiode 44 from the thin film optical filter 52 and the filter 52 is positioned in the direction of propagation of the optical beam 42. The thin film filter 52 may be a narrow band-pass filter.

A second photodiode 54 is positioned adjacent to the thin film filter 52 in the direction of propagation of beam 42. The second photodiode 54 generates an electrical signal that is proportional to the optical power of the filtered portion of the optical beam 42. The second photodiode 54 may include an AR coating on an incident surface 56 to reduce reflections that can be detected by the first photodiode 44 and that can result in erroneous signals.

A signal processor 58 receives the first and second electrical signals and generates an output signal that characterizes the optical beam. In one embodiment, the signal processor 58 generates a signal that is proportional to the ratio of the optical power of the filtered portion of the optical beam $P_\lambda$ to the optical power of the incident optical beam $P_{mon}$. That is, the signal processor generates a signal that is proportional to $P_\lambda/P_{mon}$. In another embodiment, the signal processor generates a signal that is proportional to the ratio of the difference between $P_\lambda$ and $P_{mon}$ to the sum of $P_\lambda$ and $P_{mon}$. That is, the signal processor generates a signal that is proportional to $(P_\lambda-P_{mon})/(P_\lambda+P_{mon})$. Thus in one embodiment of the invention, the wavelength transfer function of the monitor 40 can be either $P_\lambda/P_{mon}$ or $(P_\lambda-P_{mon})/(P_\lambda+P_{mon})$.

The output signal of the signal processor 58 can be used to control the wavelength and power of the optical source 41. In one embodiment, the optical source 41 is a tunable laser and an output of the signal processor 58 is electrically connected to a source controller 59. The signal generated by the signal processor causes the source controller 59 to change the wavelength and power of the optical source 41.

In operation, the first photodiode 44 generates an electrical signal that is proportional to the optical power of the incident optical beam 42 ($P_{mon}$). The portion of the incident optical beam that was not absorbed by the first photodiode 44 propagates through substrate 48 to filter 52. Filter 52 transmits a portion of the optical beam 42 that has a wavelength within a predetermined bandwidth. The filtered portion of the optical beam 42 is then detected by the second photodiode 54. The second photodiode 54 generates an electrical signal that is proportional to the optical power of the filtered portion of the optical beam ($P_\lambda$).

The signal processor 58 generates a signal that characterizes the optical beam. The signal may be proportional to $P_\lambda/P_{mon}$ or may be proportional to $(P_\lambda-P_{mon})/(P_\lambda+P_{mon})$. From the signal generated by the signal processor 58, changes in the wavelength and the optical power of the incident beam 42 can be monitored.

In one embodiment, the monitor 40 includes a source controller 59 that is electrically connected to an output of the signal processor 58. The source controller 59 receives the signal from the signal processor 58 and adjusts the wavelength and power of the optical source 41. In one embodiment, the source controller 59 is a thermo-electric cooler and the source controller 59 adjusts the temperature of the optical source 41. In another embodiment, the source controller 59 is a laser drive current controller 59 and the source controller 59 adjusts the drive current of the optical source 41.

Figure 4:
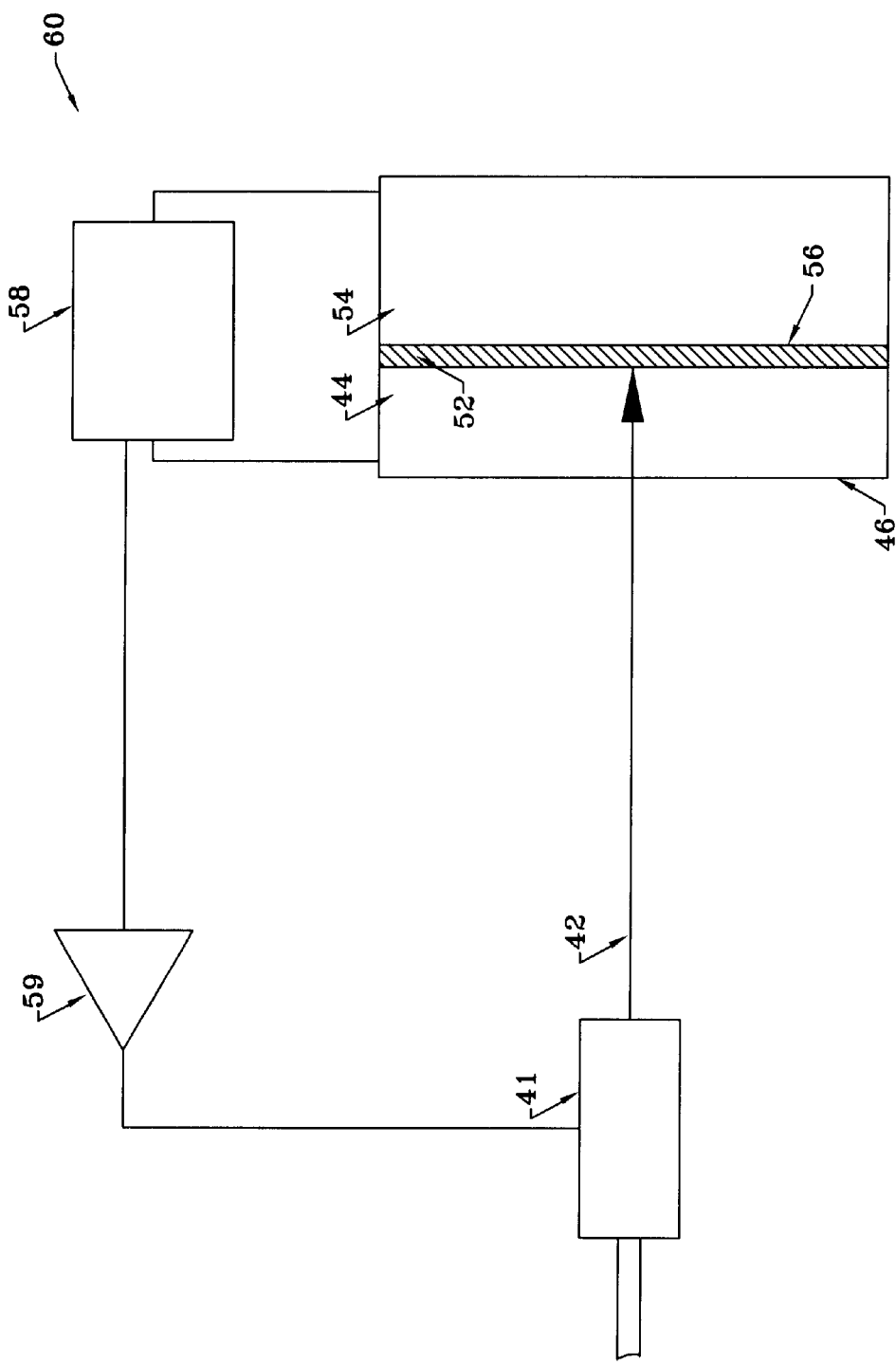
FIG. 4 is a schematic diagram of another embodiment of the wavelength and power monitor of the present invention that does not include a substrate.

FIG. 4 is a schematic diagram of another embodiment of the wavelength and power monitor 60 of the present invention. The monitor 60 is similar to the monitor 40 described in connection with FIG. 3. The monitor 60 includes a first photodiode 44 that is partially transparent. The first photodiode 44 generates a first electrical signal that is proportional to the optical power of the incident optical beam 42. The first photodiode 44 may include an AR coating on an incident surface 46 to reduce reflections from the incident surface.

The monitor 60 does not have a substrate. Instead, the monitor 60 includes a thin film optical filter 52 that is positioned directly adjacent to the first photodiode 44 in the direction of propagation of optical beam 42. The thin film filter 52 may be a narrow band-pass filter. A second photodiode 54 is positioned adjacent to the thin film filter 52 in the direction of propagation of optical beam 42. The second photodiode 54 generates an electrical signal that is proportional to the optical power of the filtered portion of the optical beam 42. The second photodiode 54 may include an AR coating on an incident surface 56 to reduce reflections that can be detected by the first photodiode 44.

A signal processor 58 receives the first and second electrical signals and generates an output signal that characterizes the optical beam. In one embodiment of the invention, the signal processor 58 generates a signal that is proportional to $P_\lambda/P_{mon}$ or $(P_\lambda-P_{mon})/(P_\lambda+P_{mon})$. From the signal generated by the signal processor 58, changes in the wavelength and the optical power of the incident beam 42 can be monitored. In one embodiment, the monitor 60 includes a source controller 59 that is electrically coupled to the output of the signal processor 58. The source controller 59 controls the wavelength and power of the optical source 41 as described in connection with FIG. 3. The operation of the monitor 60 is similar to the operation of monitor 40 described in connection with FIG. 3.

Figure 5:
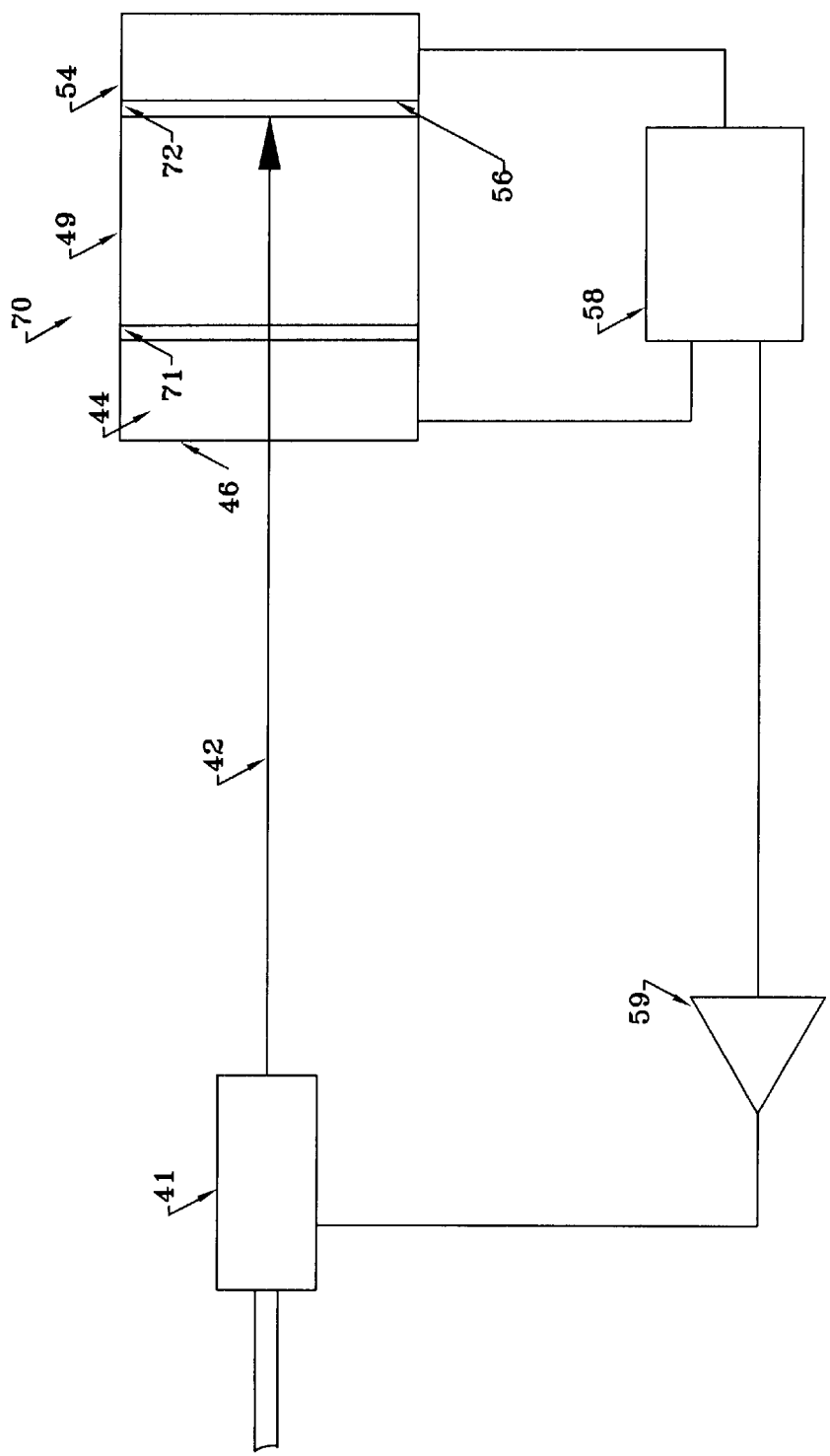
FIG. 5 is a schematic diagram of another embodiment of the wavelength and power monitor of the present invention that includes a Fabry-Perot filter.

FIG. 5 is a schematic diagram of another embodiment of the wavelength and power monitor 70 of the present invention that includes a bulk Fabry-Perot (FP) filter. The monitor 70 is similar to the monitor 40 described in connection with FIG. 3. The monitor 70 includes a first photodiode 44 that is partially transparent. The first photodiode 44 generates a first electrical signal that is proportional to the optical power of the incident optical beam 42. The first photodiode 44 may include an AR coating on an incident surface 46 to reduce reflections from the incident surface.

The monitor 70 includes a bulk Fabry-Perot filter 49 that is positioned adjacent to the first photodiode 44 in the direction of propagation of beam 42. The Fabry-Perot filter 49 has a first partially reflecting mirror 71 positioned at one end adjacent to the first photodiode 44 and a second partially reflecting mirror 72 positioned at a second end. The Fabry-Perot filter 49 produces a repetitive, comb-like transmittance and reflectance.

A second photodiode 54 is positioned adjacent to the Fabry-Perot filter 49 in the direction of propagation of beam 42. The second photodiode 54 generates an electrical signal that is proportional to the optical power of the filtered portion of the optical beam 42. The second photodiode 54 may include an AR coating on an incident surface 56 to reduce reflections that can be detected by the first photodiode 44.

A signal processor 58 receives the first and second electrical signals and generates an output signal that characterizes the optical beam. The signal processor 58 may generate a signal that is proportional to $P_\lambda/P_{mon}$ or a signal that is proportional $(P_\lambda-P_{mon})/(P_\lambda+P_{mon})$. In one embodiment, the monitor 70 includes a source controller 59 that is electrically coupled to the output of the signal processor 58. The source controller 59 controls the wavelength and power of the optical source 41 as described in connection with FIG. 3.

Figure 6:
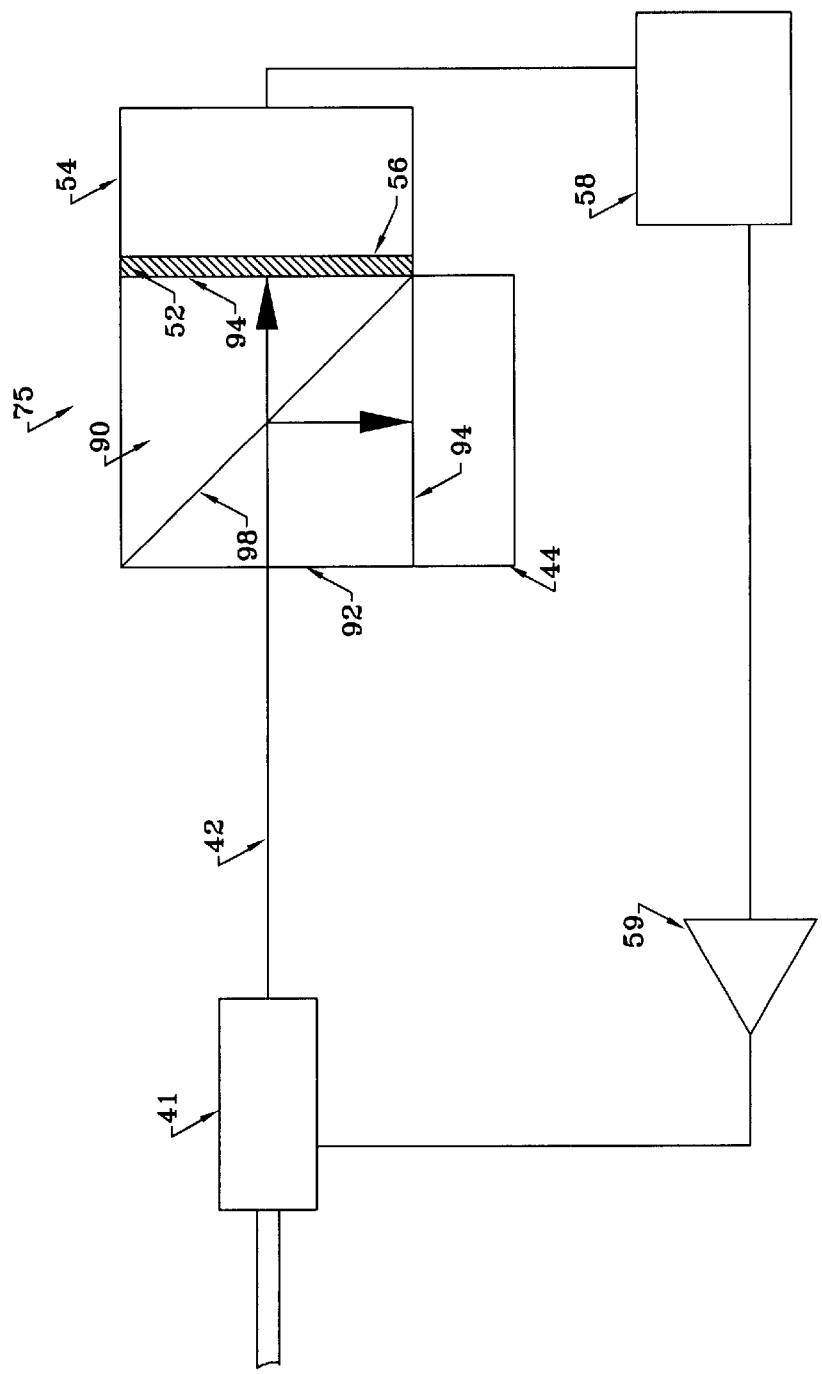
FIG. 6 is a schematic diagram of one embodiment of the wavelength and power monitor of the present invention that includes a beam splitter.

FIG. 6 is a schematic diagram of another embodiment of the wavelength and power monitor 75 of the present invention that includes a beam splitter 90. In one embodiment, the beam splitter 90 comprises a non-polarizing beam splitter. The beam splitter 90 includes a partially reflecting mirror deposited on a hypotenuse 98 that transmits a portion of the beam in the direction of propagation of the incident beam 42 and reflects a portion of beam in the direction perpendicular to the direction of propagation of incident beam 42. Beam splitter 90 may have an AR coating deposited on at least one of an incident surface 92 and an exit surface 94.

The monitor 75 includes a first photodiode 44 that is positioned in the direction perpendicular to the direction of propagation of incident beam 42. The first photodiode 44 generates a first electrical signal that is proportional to the optical power of the incident optical beam 42. The first photodiode 44 may include an AR coating on an incident surface to reduce reflections from the incident surface.

A thin film filter 52 is positioned in the direction of propagation of beam 42. A second photodiode 54 is positioned adjacent to the thin film filter 52 in the direction of propagation of beam 42. The second photodiode 54 generates an electrical signal that is proportional to the optical power of the filtered portion of the optical beam 42. The second photodiode 54 may include an AR coating to reduce reflections that can be detected by the first photodiode 44. The thin film filter 52 may be deposited onto beam splitter 90 or onto photodiode 54 or may be positioned between the beam splitter 90 and the photodiode 54.

A signal processor 58 receives the first and second electrical signals and generates an output signal that characterizes the optical beam. The operation of the monitor 75 is similar to the operation of the other embodiments of the monitor of the present invention. The signal processor 58 may generate a signal that is proportional to $P_\lambda/P_{mon}$ or a signal that is proportional $(P_\lambda-P_{mon})/(P_\lambda+P_{mon})$. In one embodiment, the monitor 75 includes a source controller 59 that is electrically coupled to the output of the signal processor 58. The source controller 59 controls the wavelength and power of the optical source 41 as described in connection with FIG. 3.

The monitor of the present invention has numerous other embodiments that use a beam splitter. For example, in one embodiment of the monitor (not shown), a first photodiode is positioned after the beam splitter in the direction of propagation of incident beam. A thin film filter and second photodiode are positioned after the beam splitter in the direction perpendicular to the incident beam. The operation of this embodiment is similar to the operation of the monitor of FIG. 6 and the wavelength transfer function of this embodiment can also be represented by $(P_\lambda/P_{mon})$ or by $(P_\lambda-P_{mon})/(P_\lambda+P_{mon})$, where $P_{mon}$ is proportional to the output electrical signal of photodiode and $P_\lambda$ is proportional to the output of the second photodiode.

Figure 7:
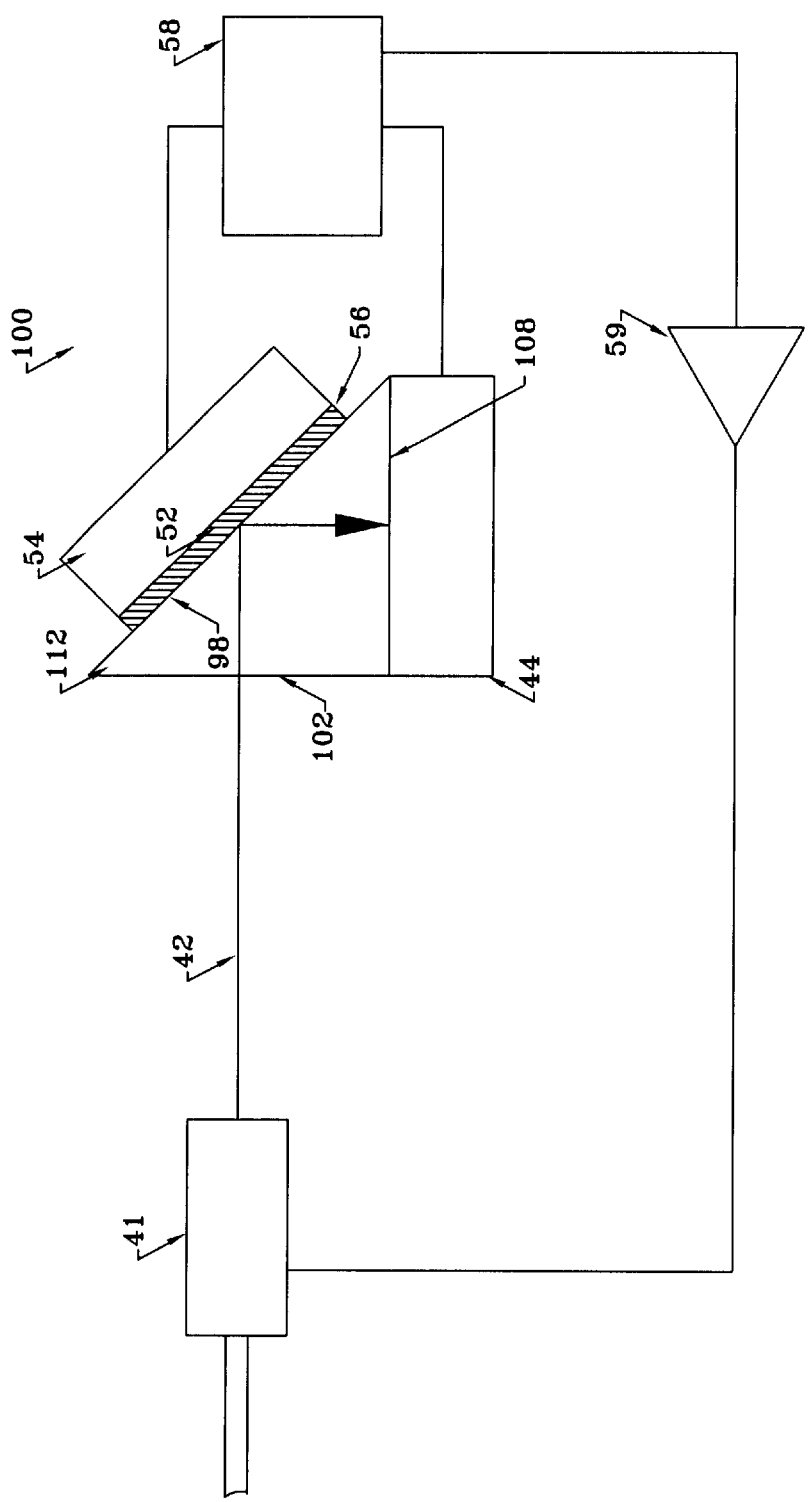
FIG. 7 is a schematic diagram of another embodiment of the wavelength and power monitor of the present invention that includes a glass wedge.

FIG. 7 is a schematic diagram of another embodiment of the wavelength and power monitor 100 of the present invention that includes a glass wedge 102. The glass wedge 102 is similar to the beam splitter 90 of FIG. 6. The glass wedge 102 transmits a portion of the beam in the direction of propagation of the incident beam 42 and reflects a portion of beam in a direction perpendicular to the direction of propagation of incident beam 42.

The monitor 100 includes a first photodiode 44 that is positioned perpendicular to the direction of propagation of incident beam 42. The first photodiode 44 generates a first electrical signal that is proportional to the optical power of the incident optical beam 42. The first photodiode 44 may include an AR coating on an incident surface to reduce reflections from the incident surface.

A thin film filter 52 is deposited or positioned on the hypotenuse 98 of the glass wedge. A second photodiode 54 is positioned adjacent to the thin film filter 52 in the direction of propagation of beam 42. The second photodiode 54 generates an electrical signal that is proportional to the optical power of the filtered portion of the optical beam 42. The second photodiode 54 may include an AR coating to reduce reflections that can be detected by the first photodiode 44.

A signal processor 58 receives the first and second electrical signals and generates an output signal that characterizes the optical beam. The operation of the monitor 75 is similar to the operation of the other embodiments of the monitor of the present invention. The signal processor 58 may generate a signal that is proportional to $P_\lambda/P_{mon}$ or a signal that is proportional $(P_\lambda-P_{mon})/(P_\lambda+P_{mon})$. In one embodiment, the monitor 60 includes a source controller 59 that is electrically coupled to the output of the signal processor 58. The source controller 59 controls the wavelength and power of the optical source 41 as described in connection with FIG. 3.

Figure 8:
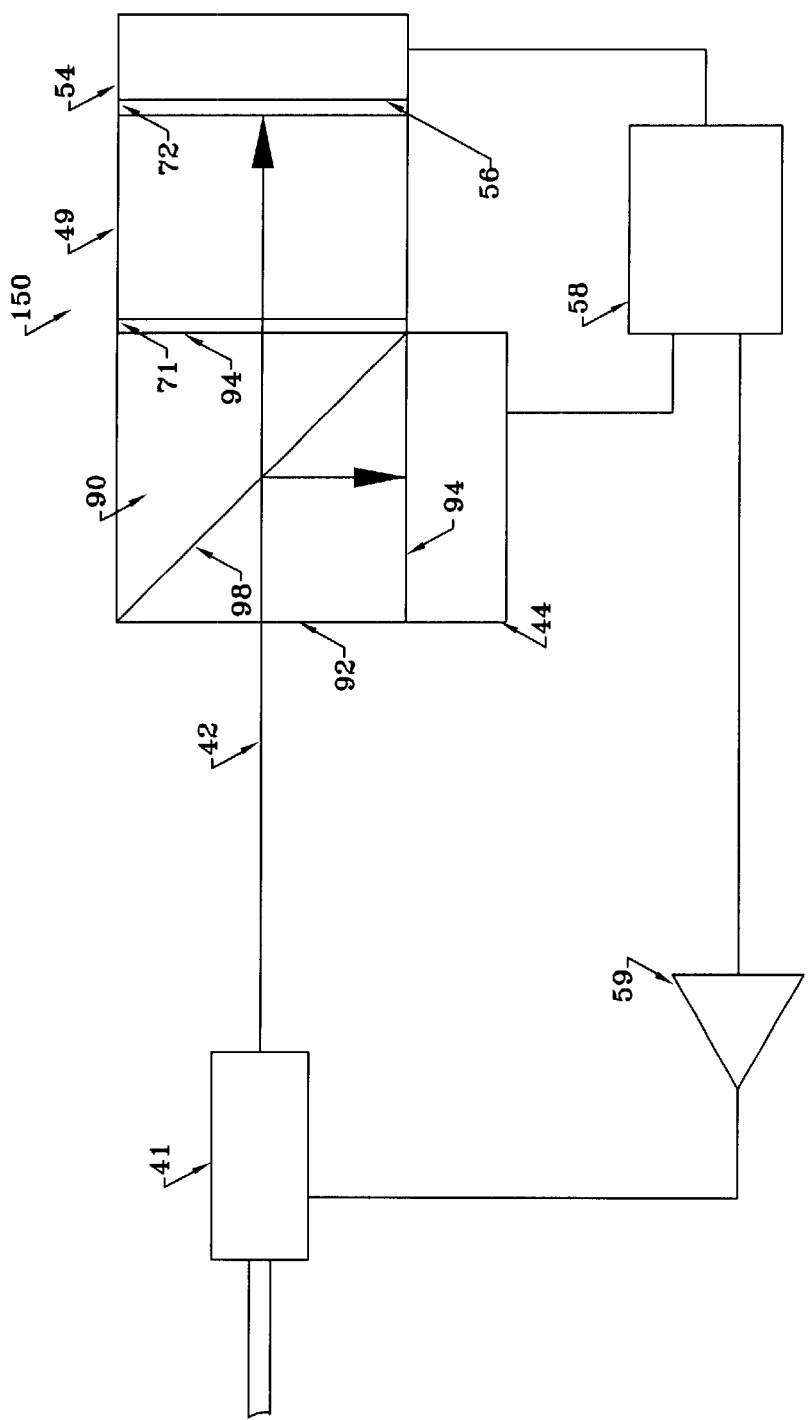
FIG. 8 is a schematic diagram of another embodiment of the wavelength and power monitor of the present invention that includes a glass substrate with.a Fabry-Perot filter and a beam splitter.

FIG. 8 is a schematic diagram of another embodiment of the wavelength and power monitor 150 of the present invention that includes a glass substrate with a Fabry-Perot filter 49 and a beam splitter 90. The beam splitter 90 has a partially reflecting mirror deposited on a hypotenuse 98 that transmits a portion of the beam in the direction of propagation of the incident beam 42 and reflects a portion of beam in a direction perpendicular to the direction of propagation of incident beam 42. Beam splitter 90 may have an AR coating deposited on at least one of an incident surface 92 and an exit surface 94.

A bulk Fabry-Perot filter 49 is positioned in the direction of propagation of the incident beam 42. The Fabry-Perot filter 49 has a first partially reflecting mirror 71 positioned at an incident end and a second partially reflecting mirror 72 positioned at an exit. The Fabry-Perot filter 49 produces a repetitive, comb-like transmittance and reflectance.

The monitor 150 includes a first photodiode 44 that is positioned perpendicular to the direction of propagation of incident beam 42. The first photodiode 44 generates a first electrical signal that is proportional to the optical power of the incident optical beam 42. The first photodiode 44 may include an AR coating on an incident surface to reduce reflections from the incident surface. The optical power detected by the first photodiode 44 is independent of the beam reflected from the Fabry-Perot filter 49.

The monitor 150 includes a second photodiode 54 that is positioned adjacent to the Fabry-Perot filter 49 in the direction of propagation of the incident beam. The second photodiode 54 generates an electrical signal that is proportional to the optical power of the filtered portion of the incident beam 42.

A signal processor 58 receives the first and second electrical signals and generates an output signal that characterizes the optical beam 42. The operation of the monitor 150 is similar to the operation of the other embodiments of the monitor of the present invention. The signal processor 58 may generate a signal that is proportional to $P_\lambda/P_{mon}$ or a signal that is proportional $(P_\lambda-P_{mon})/(P_\lambda+P_{mon})$. In one embodiment, the monitor 150 includes a source controller 59 that is electrically coupled to the output of the signal processor 58. The source controller 59 controls the wavelength and power of the optical source 41 as described in connection with FIG. 3.

Figure 9:
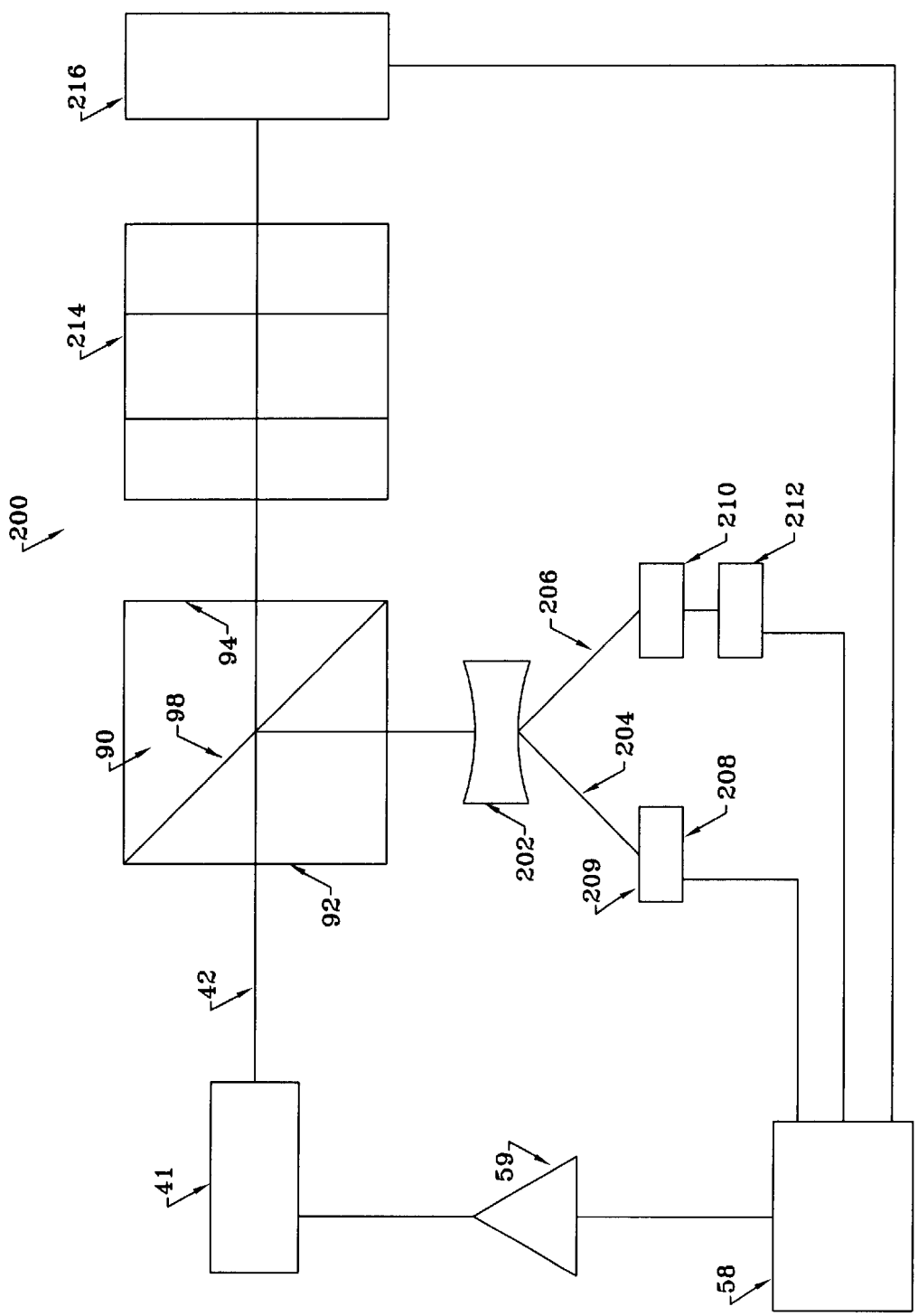
FIG. 9 is a schematic diagram of a broadband wavelength and power monitor of the present invention that includes a wideband thin film filter for course wavelength monitoring and a Fabry-Perot Etalon for fine wavelength monitoring.

FIG. 9 is a schematic diagram of a broadband wavelength, and power monitor 200 of the present invention that includes a wideband thin film filter for course wavelength monitoring and a Fabry-Perot Etalon for fine wavelength monitoring. The monitor 200 includes an optical source 41, such as a tunable semiconductor laser, that generates an optical beam 42. A collimating lens (not shown) may be positioned in the path of the incident optical beam 42.

A beam splitter 90 is positioned in a path of the optical beam 42. In one embodiment, the beam splitter 90 comprises a non-polarizing beam splitter. The beam splitter 90 includes a partially reflecting mirror deposited on a hypotenuse 98 that transmits a portion of the beam in the direction of propagation of the incident beam 42 and reflects a portion of beam in the direction perpendicular to the direction of propagation of incident beam 42. Beam splitter 90 may have an AR coating deposited on at least one of an incident surface 92 and an exit surface 94.

The monitor 200 includes a second beam splitter 202 that is positioned in the path of the portion of beam in the direction perpendicular to the direction of propagation of incident beam 42. The second beam splitter 202 splits the reflected portion of the beam into a first 204 and a second optical path 206. In one embodiment, the second beam splitter 202 is a cylindrical lens.

A first photodiode 208 is positioned in the first path 204. The first photodiode 208 generates a first electrical signal that is proportional to the optical power of the incident optical beam 42. The first photodiode 208 may include an AR coating on an incident surface 209 to reduce reflections from the incident surface 209.

A coarse filter 210 is positioned in the second path 206. In one embodiment, the coarse filter 210 comprises a thin film filter. The coarse filter 210 passes a relatively broadband optical signal. A second photodiode 212 is positioned after the coarse filter 210 in the second path 206. The second photodiode 212 generates a second electrical signal that is proportional to the optical power of the broadband optical signal.

A Fabry-Perot Etalon 214 is positioned in the direction of propagation of the incident beam 42. A Fabry-Perot Etalon or Fabry-Perot interferometer is a relatively fine wavelength or narrow band filter that passes optical signals having multiple wavelengths corresponding to the multiple optical paths of the Fabry-Perot Etalon 214. A third photodiode 216 is positioned in.the direction of propagation of the incident beam 42 after the Fabry-Perot Etalon 214. The third photodiode 216 detects the multiple wavelengths corresponding to the multiple optical paths of the Fabry-Perot Etalon 214 and generates a third electrical signal that is proportional to the optical power in the beam transmitted by the Fabry-Perot Etalon 214.

A signal processor 58 receives the first, second, and third electrical signals and generates an output signal that characterizes the optical beam 42. The signal processor 58 may generate a signal that is proportional to $P_\lambda/P_{mon}$ or a signal that is proportional $(P_\lambda-P_{mon})/(P_\lambda+P_{mon})$. In one embodiment, the monitor 200 includes a source controller 59 that is electrically coupled to the output of the signal processor 58. The source controller 59 controls the wavelength and power of the optical source 41 as described in connection with FIG. 3.

Figure 10:
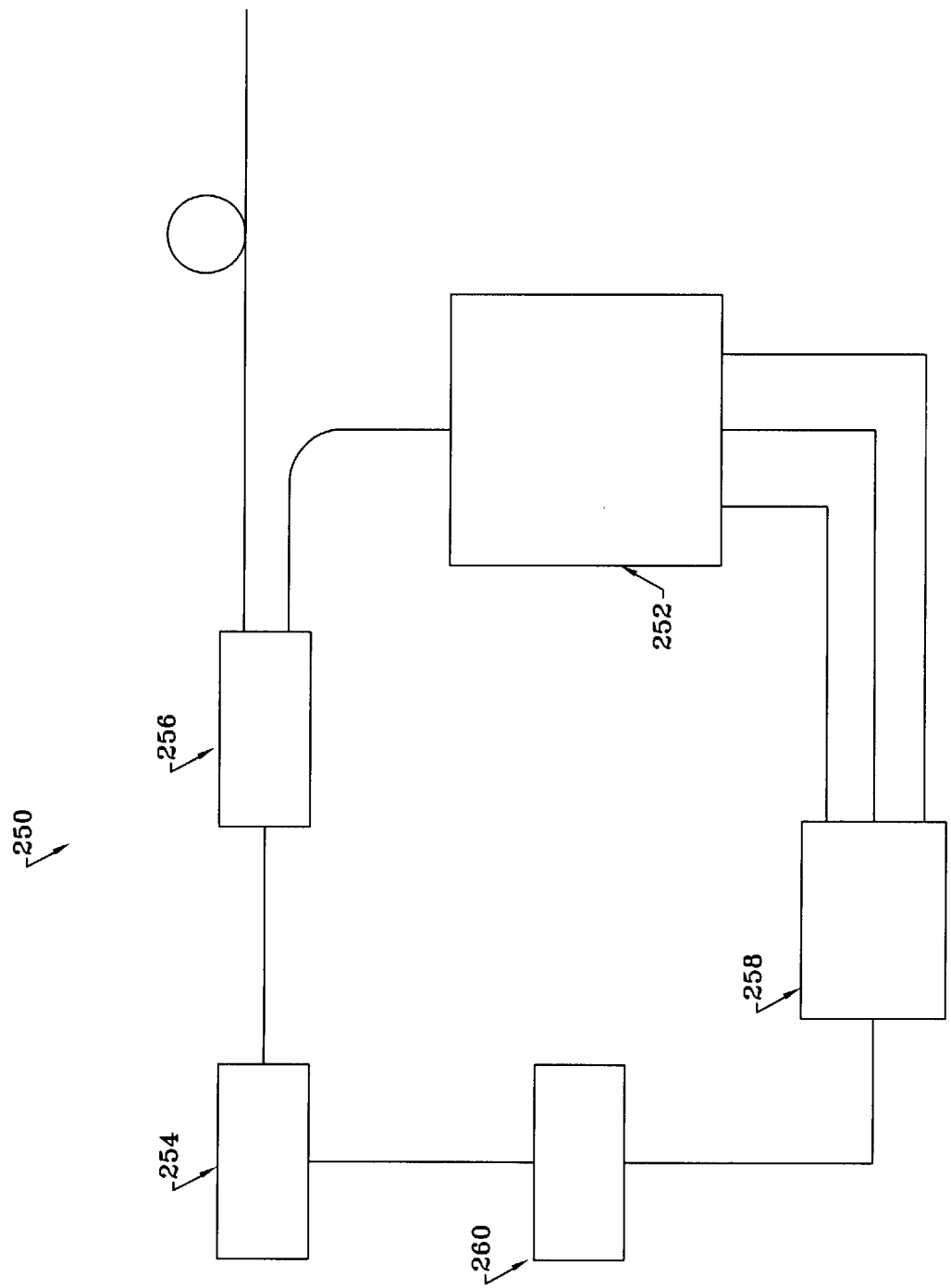
FIG. 10 is a schematic diagram of an optical communication system that includes the wavelength and power monitor of the present invention to control the output of a tunable laser.

FIG. 10 is a schematic diagram of an optical communication system 250 that includes the wavelength and power monitor of the present invention 252 to control the output of a tunable laser 254. The tunable laser 254 is optically coupled to an optical modulator 256. The optical modulator 256 modulates the output of the tunable laser 254 and generates a modulated optical beam. In one embodiment, the modulated optical beam is coupled into an optical fiber of the optical communication system. A portion of the modulated optical beam is coupled into the wavelength and power monitor 252. In one embodiment, the modulator is a Mach Zehnder interferometer and the wavelength and power monitor 252 is optically coupled to the second port of the interferometer.

The wavelength and power monitor 252 can be any monitor according to the present invention. For example, the monitor 252 can be the broadband monitor described in connection with FIG. 9. In this embodiment, the monitor 252 generates a first, second and third electrical signal. A signal processor 258 receives the first, second, and third electrical signals and generates a signal at an output that characterizes the optical beam 42.

The output of the signal processor 258 is electrically coupled to an input of a tunable laser controller 260. The tunable laser controller 260 receives the signal generated by the signal processor and controls the optical power and wavelength of the laser. In one embodiment, the tunable laser controller 260 is a thermoelectric cooler and that controls the tunable laser 254 by controlling the temperature of the laser. In another embodiment, the tunable laser controller 260 is a laser drive current controller and controls the tunable laser 254 by changing the drive current of the laser.

The wavelength and power monitor of the present invention has numerous advantages over prior art monitors. One advantage is that the monitor of the present invention monitors one portion of the mode of a single optical beam and substantially simultaneously determines the wavelength and the optical power of a single optical beam. Monitoring one portion of the mode of a single optical beam avoids the problems associated with differential detection that are described above. Since the monitor of the present invention samples the same potion of the beam, it is less susceptible to the modal stability of the optical source being monitored. This feature improves the long-term stability of the monitor. This feature also enables semiconductor laser sources to be operated in a constant power mode instead of a constant current mode. This is because the mode structure of semiconductor lasers is dependent on the injection current of the laser.

Equivalents

While the invention has been particularly shown and described with reference to specific preferred embodiments, it should be understood by those skilled in the art that various changes in form and detail may be made therein without departing from the spirit and scope of the invention as defined by the appended claims.

I claim:

1. An apparatus that monitors an optical power and a wavelength of an optical beam in a wavelength division multiplexed (WDM) communication systems the apparatus comprising:

a. a first beamsplitter positioned to receive the optical beam, the first beamsplitter splitting the optical beam into a first optical path and a second optical path;

b. a second beamsplitter positioned in the second optical path, the second beamsplitter splitting the optical beam into a third and a fourth optical path;

c. a first detector positioned in the third optical path, the first detector generating a first electrical signal that is proportional to the optical power of the optical beam;

d. a broadband optical filter positioned in the fourth optical path, the broadband optical filter being adapted to substantially prevent reflections of the optical beam and to transmit a broadband optical beam corresponding to at least two channels of the WDM communication system;

e. a second detector positioned in a path of the broadband optical beam, the second detector generating a second electrical signal that is proportional to an optical power of the broadband optical beam;

f. a narrowband optical filter positioned in a first optical path, the narrowband optical filter being adapted to substantially prevent reflections of the optical beam and to transmit a narrowband optical beam corresponding to a channel of the WDM communication system;

g. a third detector positioned in a path of the narrowband optical beam, the third detector generating a third electrical signal that is proportional to an optical power of the narrowband optical beam; and h. a signal processor that receives the first, the second, and the third electrical signals, the signal processor generating at least one signal that is proportional to the wavelength and the optical power of the optical beam.

2. The apparatus of claim 1 wherein the at least one signal generated by the signal processor is proportional to an optical power of the broadband optical beam.

3. The apparatus of claim 1 wherein the at least one signal generated by the signal processor is proportional to a wavelength of the broadband optical beam.

4. The apparatus of claim 1 wherein the at least one signal generated by the signal processor is proportional to an optical power of the narrowband optical beam.

5. The apparatus of claim 1 wherein the at least one signal generated by the signal processor is proportional to a wavelength of the narrowband optical beam.

6. The apparatus of claim 1 wherein at least one of the first detector, the second detector, and the third detector includes an anti-reflection coating on an incident surface.

7. A method for monitoring an optical power and a wavelength of an optical beam, the method comprising:

a. detecting the optical beam along an optical beam path;

b. generating a first electrical signal that is proportional to the optical power of the optical beam;

c. transmitting a portion of the optical beam along the optical beam path having a wavelength within a predetermined bandwidth while substantially preventing reflections of the optical beam;

d. detecting the portion of the optical beam along the optical beam path having the wavelength within the predetermined bandwidth;

e. generating a second electrical signal that is proportional to an optical power of the portion of the optical beam having the wavelength within the predetermined bandwidth; and f. processing the first and the second electrical signals to generate a signal that characterizes the optical beam.

8. The method of claim 7 wherein the generated signal is proportional to an optical power of the optical beam.

9. The method of claim 7 wherein the generated signal is proportional to a wavelength of the optical beam.

10. The method of claim 7 wherein the steps of detecting the optical beam along an optical beam path and detecting a portion of the optical beam along the optical beam path having the wavelength within the predetermined bandwidth comprise detecting the same portion of a mode of the optical beam.

11. The method of claim 7 further comprising the step of detecting a portion of the optical beam having a wavelength within a second predetermined bandwidth and generating a third electrical signal that is proportional to an optical power of the portion of the optical beam having the wavelength within the second predetermined bandwidth.

\* \* \* \* \*